(12) United States Patent
Blasco Claret et al.

(10) Patent No.: US 8,811,508 B2
(45) Date of Patent: Aug. 19, 2014

(54) PROCEDURE FOR SIMULTANEOUS TRANSMISSION IN TIME AND FREQUENCY OF MULTIPLE COMMUNICATIONS OF DATA BY MEANS OF OFDM MODULATIONS

(71) Applicant: Marvell Hispania, S.L.U., Madrid (ES)

(72) Inventors: Jorge Vicente Blasco Claret, Valencia (ES); Salvador Iranzo Molinero, Valencia (ES); Luis Manuel Torres Canton, Valencia (ES); Agustin Badenes Corella, Castellon (ES)

(73) Assignee: Marvell Hispania, S.L.U., Madrid (ES)

( * ) Notice: Subject to any disclaimer, the term of this patent is extended or adjusted under 35 U.S.C. 154(b) by 0 days.

(21) Appl. No.: 13/863,035

(22) Filed: Apr. 15, 2013

(65) Prior Publication Data

US 2013/0230117 A1    Sep. 5, 2013

Related U.S. Application Data

(63) Continuation of application No. 12/225,916, filed on Feb. 12, 2009, now Pat. No. 8,422,571, which is a continuation of application No. PCT/ES2007/000186, filed on Apr. 2, 2007.

(51) Int. Cl.
*H04K 1/10*    (2006.01)
(52) U.S. Cl.
USPC ........... 375/260; 375/267; 375/299; 375/347; 375/348; 375/349
(58) Field of Classification Search
USPC ................... 375/260, 267, 299, 347, 348, 349
See application file for complete search history.

(56) References Cited

U.S. PATENT DOCUMENTS

| | | | |
|---|---|---|---|
| 8,422,571 B2 | 4/2013 | Blasco Claret et al. | |
| 2002/0181509 A1 | 12/2002 | Mody et al. | |
| 2004/0257981 A1 | 12/2004 | Ro et al. | |
| 2005/0063489 A1* | 3/2005 | Williams et al. | 375/316 |
| 2005/0068886 A1* | 3/2005 | Wang et al. | 370/210 |
| 2005/0105460 A1 | 5/2005 | Suh et al. | |
| 2005/0111522 A1 | 5/2005 | Sung et al. | |
| 2005/0281316 A1 | 12/2005 | Jang et al. | |
| 2006/0025136 A1 | 2/2006 | Fujita et al. | |

OTHER PUBLICATIONS

International Search Report, with English translation, issued Aug. 28, 2007 in connection with Spanish (PCT) International Application No. PCT/ES2007/000186 corresponding to the present U.S. application.
European Search Report issued Feb. 5, 2014 corresponding to European Application No. 07730426.9, 7 pages.

* cited by examiner

*Primary Examiner* — Kabir A Timory

(57) ABSTRACT

A system including a first network device, a second network device, and a third network device. The first network device is configured to transmit a first starting signal. The second network device configured to transmit a second starting signal, wherein at least one of the first network device and the second network device is further configured to change a ratio between at least one of respective phases of carriers of the first starting signal and the second starting signal and respective amplitudes of the carriers of the first starting signal and the second starting signal. The third network device is configured to receive the first starting signal and the second starting signal, selectively allow communication with the first network device based on the ratio, and ignore communication from the second network device based on the ratio.

16 Claims, 5 Drawing Sheets

PROCEDURE FOR SIMULTANEOUS TRANSMISSION IN TIME AND FREQUENCY OF MULTIPLE COMMUNICATIONS OF DATA BY MEANS OF OFDM MODULATIONS

CROSS-REFERENCE TO RELATED APPLICATIONS

The present disclosure is a continuation of U.S. patent application Ser. No. 12/225,916 (now U.S. Pat. No. 8,422, 571), filed on Feb. 12, 2009, which is a continuation of PCT/ES2007/000186 (now WIPO Publication WO 2007/113359), filed Apr. 2, 2007. The entire disclosures of the applications referenced above are incorporated herein by reference.

OBJECT OF THE INVENTION

As stated in the title of this descriptive specification, the present invention relates to a procedure for simultaneous transmission in time and frequency of multiple communications of data by means of OFDM modulations. The technical field of the invention is that of data communications in any transmission medium, and its main advantage is that it allows equipment to be capable of correctly receiving signals from its own network while ignoring signals of lesser power reaching it from other networks, without any need to carry out a post-processing on reception. Thanks to this, the inventive procedure permits the reutilization of the channel in time and frequency for different communications by means of modifications in the starting symbols, in such a way that the rest of the communications are indistinguishable from the background noise for a given communication. The transmission capacity is thereby increased due to not having to use mechanisms for sharing the channel among the different communications.

PRIOR ART OF THE INVENTION

In the majority of telecommunications systems, a situation can occur in which many different communications are transmitting at the same time via the same channel. This can happen voluntarily, in order to try to transmit a greater amount of information, or because there exist different data networks whose communications cross in the same moment.

In the state of the art, the procedure for distinguishing the right communication consists for of addressing the communications by means of incorporating a destination address in the information being transmitted. In order to use this method, the receiver needs to demodulate the signal so that it can then accept it or reject it, in the event that it does not contain the right address. Another possibility is to coordinate the networks using co-existence procedures for sharing out the time or range of frequencies of the communications channel among the different communications.

One possible solution is described in patent WO 10 98/09381, titled "High Capacity Wireless Communication Using Spatial Subchannels" in which the communications channel is separated into a series of independent subchannels for each one of the communications. In that procedure, an array of antennas is used for carrying out the spatial separation of the subchannels. The present invention consists of a totally different procedure in which no additional processing is needed for achieving the co-existence of communications in a single channel.

Another form of carrying out multiple accesses to the channel is to use code division multiplexing (CDMA). This method requires widening the transmission bandwidth, and so a much broader bandwidth is used than that needed for carrying out the communication. The procedure of the invention improves the efficiency since the bandwidth of the signal is not widened.

In either of these methods of the state of the art, it is necessary to carry out processing on reception in order to recover the correct information from the equipment belonging to the same network. The inventive procedure avoids having to carry out synchronization with the signals of lesser power arriving from other networks, and therefore there is no need to carry out a processing on reception, since the signals from other networks become merged with the background noise of the channel.

It can be pointed out that the Spanish patent referring to "Access procedure to transmission means of multiple communications nodes on electric network" with number E52221803, belonging to the same patent holder as the present invention, describes a procedure in which a transmission starting signal is used. The inventive procedure can be used on this signal in order to solve the problems of interference produced among communications nodes using the same technology but belonging to different networks using the same communications channel.

DESCRIPTION OF THE INVENTION

In order to achieve the objectives and avoid the drawbacks mentioned above, the invention consists of a procedure for simultaneous transmission in time and frequency of multiple communications of data by means of OFDM modulations, where multiple communications of data are being carried out at the same time on the same channel and in which a starting signal is used in the transmission of the frame, characterized in that it comprises modifying the starting signal for transmission of each communication by means of altering at least one parameter constituting that signal in such a way that the rest of the communications coinciding in time and frequency with respect to a given communication are regarded by it as being noise.

Each communication is characterized by the use of a common set of starting signals with certain distinct characteristics from the rest of the communication.

There exist many different ways of modifying the characteristics of the starting signal which can be used to form the set of distinct communications, and the one chosen by the invention is the alteration of the parameters constituting said signal. Standing out among these alterations is the frequency shift of that signal, time shift, alteration of the symmetry characteristics of the signal, of the duration of each repetition of the base signals forming the stating signal, of the phase and amplitude ratios between the carriers of the starting signal or alteration of the number of repetitions of the base signals forming the starting signal. A combination of these alterations could also be used.

In the particular case of using a frequency shift in order to modify the starting signal, said shift will be equal to a fraction of the separation between carriers of the OFDM modulation.

Below, in order to facilitate a better understanding of this descriptive specification and forming an integral part thereof, some figures are attached in which, on an illustrative rather than limiting basis, the object of the invention has been represented.

DESCRIPTION

A description is now going to be given of various examples of embodiment of the invention, with reference to the numbering adopted in the figures.

Figure 1:
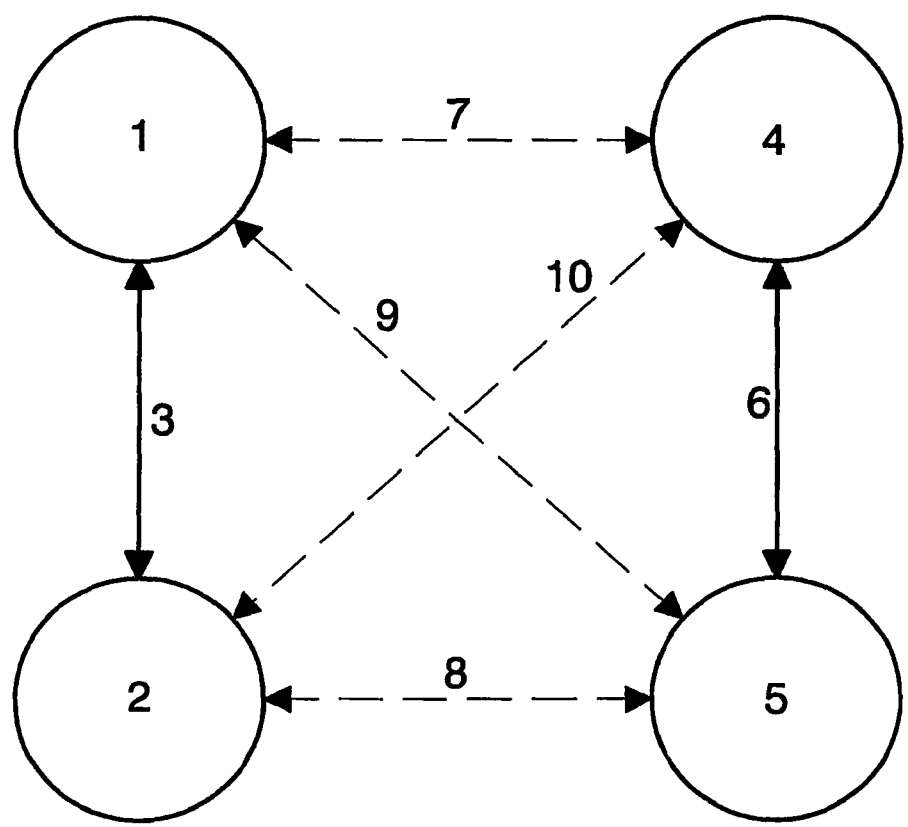
FIG. 1 represents two master slave networks in which the communications within each network interfere with the communications of the other network.

FIG. 1 shows a typical example in which the inventive procedure can be used for increasing the transmission capacity when there exist two communications from different networks using the same channel. In this example, two independent master-slave networks are represented, the first network comprising master equipment (1) and slave equipment (2) and the second network master equipment (4) and slave equipment (5). The proximity between the two networks means that the communications (3) made in the first network and the communications (6) made in the second network can be received by the opposite network, though presumably with less power than that sent by the equipment in the communications network itself. Due to using the same communications technology, the messages sent by the other network will be received, demodulated and finally rejected (due to not belonging to the equipment of the network itself with all the cost that this entails. This problem can occur in communication (7) between masters and in communication (8) between slaves and even in crossed communication (9) and (10) between the masters and slaves of opposing networks.

Figure 3:
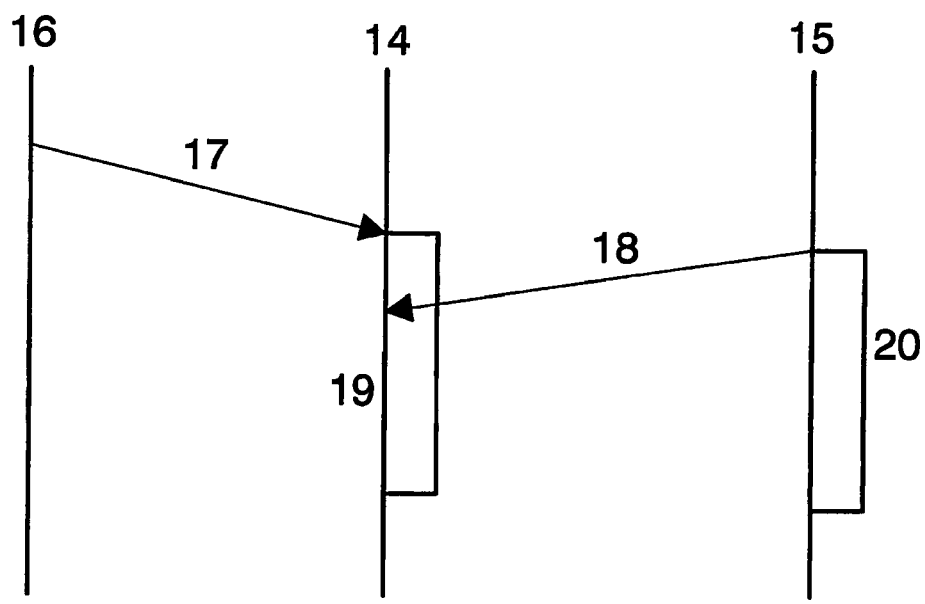
FIG. 3 shows an example of the problem it is intended to avoid: confusing a starting signal received from another network with the starting signal of one's own network.

In FIG. 3 an example can be seen of what happens when equipment (14) receives a starting signal for a frame from the other equipment in its own network (15) and from the other equipment of the other network (16) using similar technology. Although the starting signal (17) received from the other network arrives with less power than the starting signal (18) of the network itself, if the signal (17) from the other network is ahead of the starting signal (18) of the actual network, then the equipment will synchronize itself to the first one and open a reception window (19), which will cause the loss of part of the information (20) sent by the equipment from its own network.

In general, the starting signal for frames has certain properties which the receiver looks for in the signals received via the channel in order to be able to receive the data being sent. These properties can be one or more of the following: symmetry of the signal, duration of each repetition, spectral position, phase/amplitude ratio between carriers, or the total duration of the signal. By minimally modifying the properties of the starting signal for the frame it is possible to prevent detection by the receivers looking exactly for that property, in such a way that various sets of possible tuned transmitters and receivers will be achieved which would be capable of continuing with their own communications while merging the communications from the other sets with the background noise. This constitutes the main advantage of the inventive procedure. Given that the communications from the other systems come to form part of the background noise and this can imply an increase in that noise, the performance of each individual system can find itself reduced, but, by being able to transmit several sets simultaneously, the aggregate performance of them all can be greater.

Although there exist many different means for achieving this effect, by modifying the characteristics of the starting signal, in this specific example of embodiment, a frequency shift is performed between the carriers making up the starting signal for the two communications in such a way that the carriers have sufficient separation so that a receiver that is not synchronized with the correct position of the carriers is incapable of obtaining the information transmitted in the shifted carriers.

Figure 2:
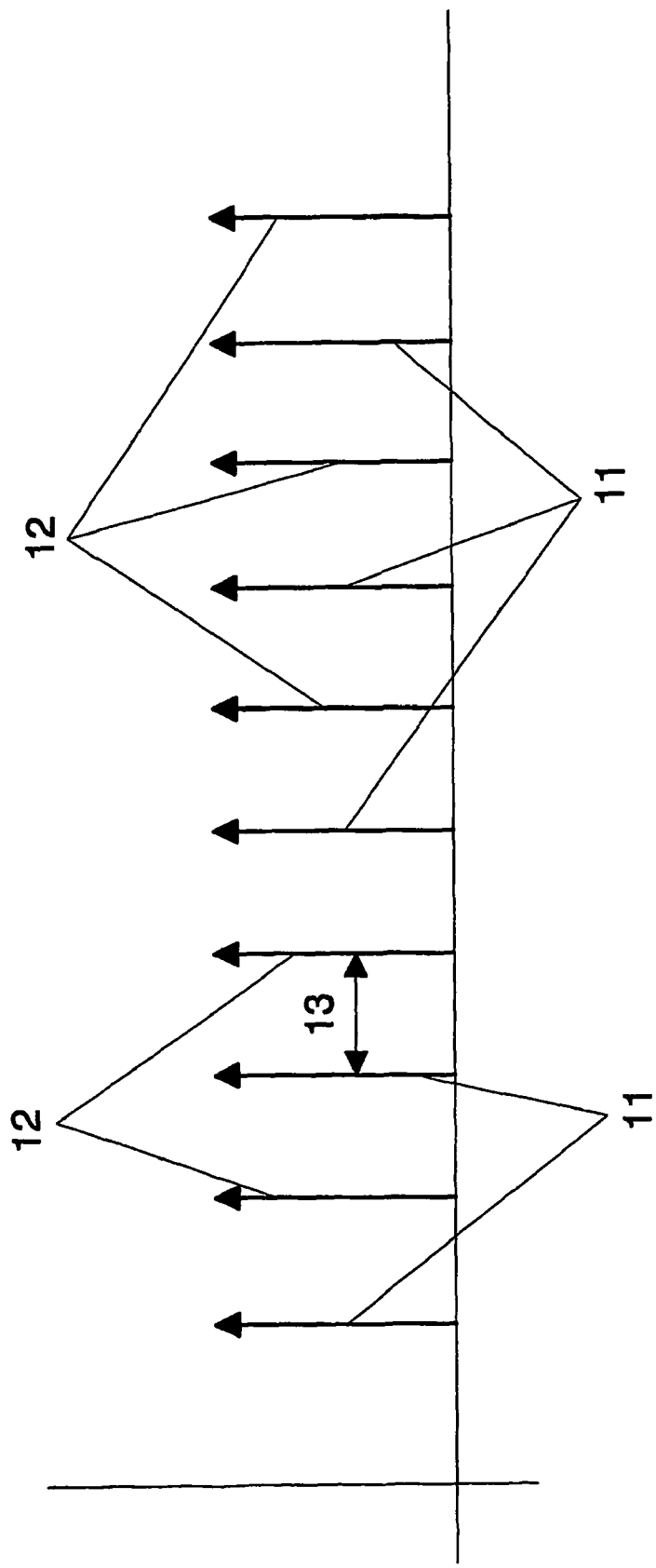
FIG. 2 shows the alteration to the starting signal consisting of the frequency shift of the communication carriers using the inventive procedure.

In FIG. 2, the shift of carriers can be observed between the two systems in the example of embodiment. In this case, the shift is ½ that of the distance between carriers, though other fractions of this value could be used, such as ¼ or ¾ with similar results. In that figure the situation in frequency of the carriers (11) of the first network and the carriers (12) of the second network 10 can be seen. Likewise, the figure shows the frequency shift (13) between the carriers (11) and (12) of the two networks.

Figure 4:
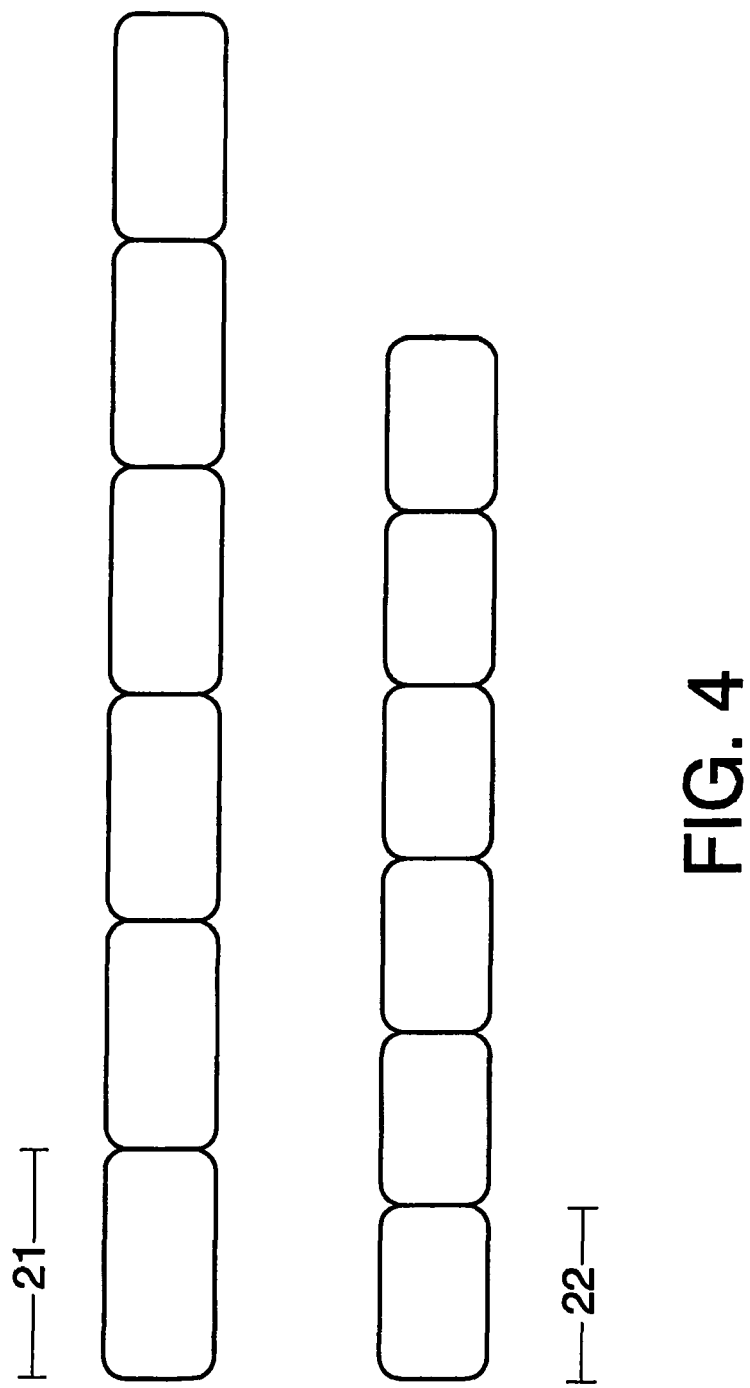
FIG. 4 represents an example of embodiment in which the alteration of the starting signal consists of modifying the duration of the repetitions of the base signals forming that signal.
Figure 5:
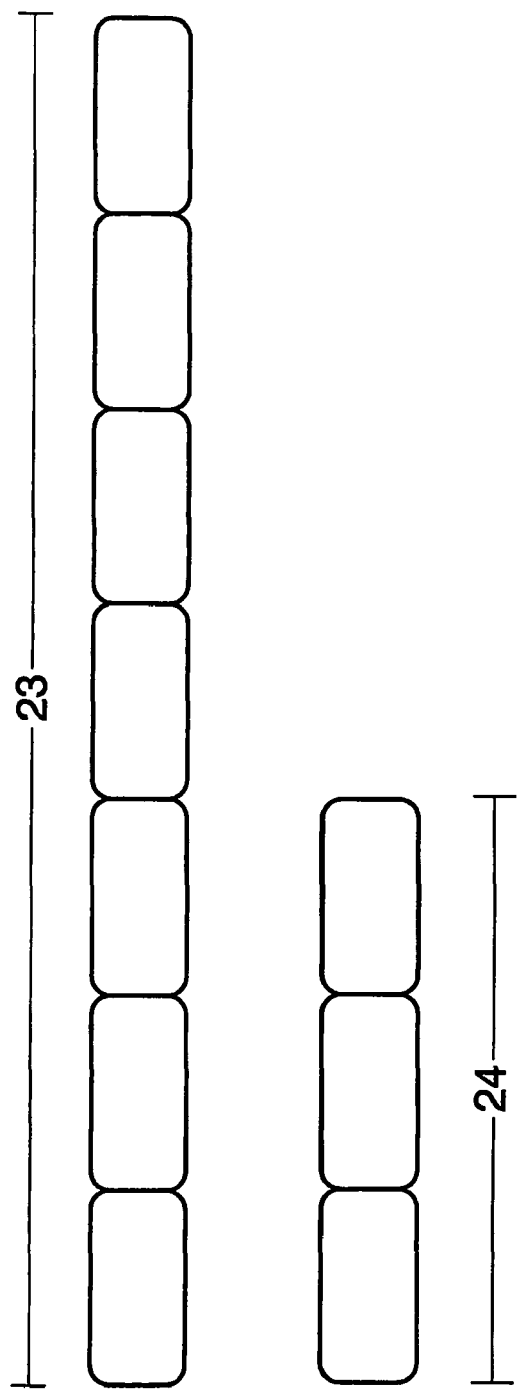
FIG. 5 represents an example of embodiment in which the alteration of the starting signal consists of using a different number of repetitions of the base signals forming that signal.

Another example of embodiment can be seen in FIG. 4 in which the alteration of the starting signal consists of changing the duration of the repetitions of the base signal forming the starting signal. Represented in that FIG. 4 are the duration (21) of each repetition in the first network and the duration (22) in the second network. On receiving a starting signal, if the duration (22) of each repetition is different from the duration (21) selected in the actual network, then the receiver will ignore that signal. The starting signal can also be altered by modifying the number of repetitions of the base signals forming the starting signal. This example of embodiment can be seen in FIG. 5, where one network functions with a starting signal have seven repetitions (23) and the other network functions with a starting signal having three repetitions (24). If the receiver does not hear the number of repetitions selected in its network, it ignores the starting signal and waits until it receives a starting signal with the right number of repetitions.

What is claimed is:

1. A system, comprising:
a first network device configured to transmit a first starting signal;
a second network device configured to transmit a second starting signal, wherein at least one of the first network device and the second network device is further configured to change a ratio between at least one of i) respective phases of carriers of the first starting signal and the second starting signal, and ii) respective amplitudes of the carriers of the first starting signal and the second starting signal; and
a third network device configured to
  i) receive the first starting signal and the second starting signal,
  ii) selectively allow communication with the first network device based on the ratio,
  iii) ignore communication from the second network device based on the ratio,
  iv) selectively allow communication with the first network device further based on a frequency of the first starting signal and a frequency of the second starting signal, and
  v) ignore communication from the second network device further based on the frequency of the first starting signal and the frequency of the second starting signal.

2. The system of claim 1, wherein the first starting signal and the second starting signal are transmitted and received using a first channel.

3. The system of claim 1, wherein the frequency of the first starting signal is shifted a fraction of a separation between OFDM carriers of the first starting signal and the second starting signal.

4. The system of claim 1, wherein the first network device and the second network device are slave network devices, and wherein the third network device is a master network device.

5. The system of claim 1, wherein the first network device and the third network device are in a first network, and wherein the second network device is in a second network.

6. The system of claim 1, wherein the third network device is configured to selectively allow communication with the first network device further based on at least one of a time shift, symmetry characteristics, a duration of repetitions, and a number of repetitions of the first starting signal and the second starting signal.

7. The system of claim 1, wherein the third network device is configured to selectively allow communication with the first network device further based on a determination that a frequency of the first starting signal corresponds to a desired frequency.

8. The system of claim 1, wherein the third network device is configured to ignore communication from the second network device further based on a determination that the frequency of the second starting signal does not correspond to a desired frequency.

9. A method, comprising:
transmitting, from a first network device, a first starting signal;
transmitting, from a second network device, a second starting signal;
changing a ratio between at least one of i) respective phases of carriers of the first starting signal and the second starting signal, and ii) respective amplitudes of the carriers of the first starting signal and the second starting signal; and
using a third network device,
i) receiving the first starting signal and the second starting signal,
ii) selectively allowing communication with the first network device based on the ratio and further based on a frequency of the first starting signal and a frequency of the second starting signal,
iii) ignoring communication from the second network device based on the ratio, and
iv) ignoring the communication from the second network device further based on the frequency of the first starting signal and the frequency of the second starting signal.

10. The method of claim 9, wherein the first starting signal and the second starting signal are transmitted and received using a first channel.

11. The method of claim 9, further comprising shifting the frequency of the first starting signal a fraction of a separation between OFDM carriers of the first starting signal and the second starting signal.

12. The method of claim 9, wherein the first network device and the second network device are slave network devices, and wherein the third network device is a master network device.

13. The method of claim 9, wherein the first network device and the third network device are in a first network, and wherein the second network device is in a second network.

14. The method of claim 9, wherein selectively allowing the communication with the first network device includes:
selectively allowing the communication with the first network device further based on at least one of a time shift, symmetry characteristics, a duration of repetitions, and a number of repetitions of the first starting signal and the second starting signal.

15. The method of claim 9, wherein selectively allowing the communication with the first network device includes:
selectively allowing the communication with the first network device further based on a determination that a frequency of the first starting signal corresponds to a desired frequency.

16. The method of claim 9, wherein ignoring the communication from the second network device includes:
ignoring the communication from the second network device further based on a determination that a frequency of the second starting signal does not correspond to a desired frequency.

* * * * *